Dec. 16, 1947.  P. DAVEY  2,432,730
BALANCE TESTING
Filed April 14, 1943  4 Sheets-Sheet 1
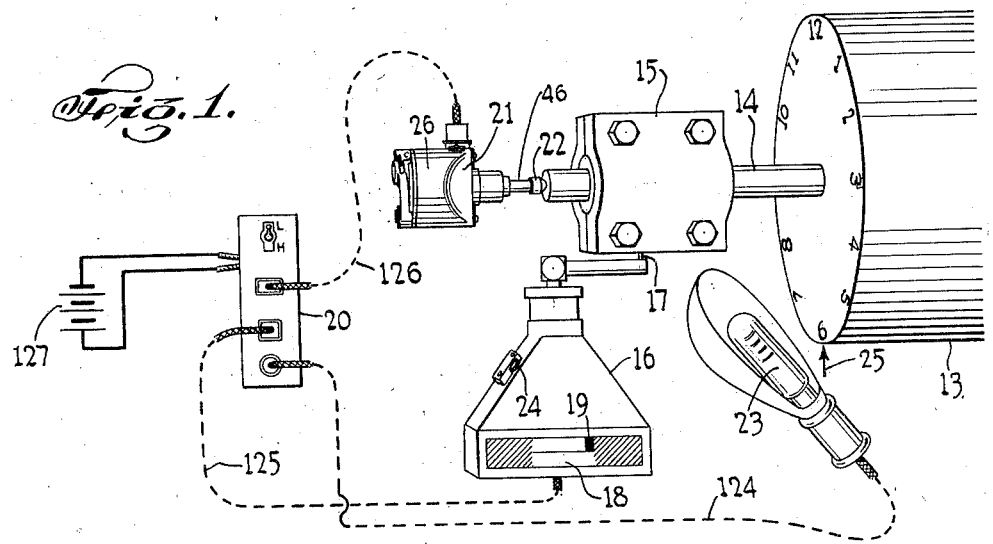
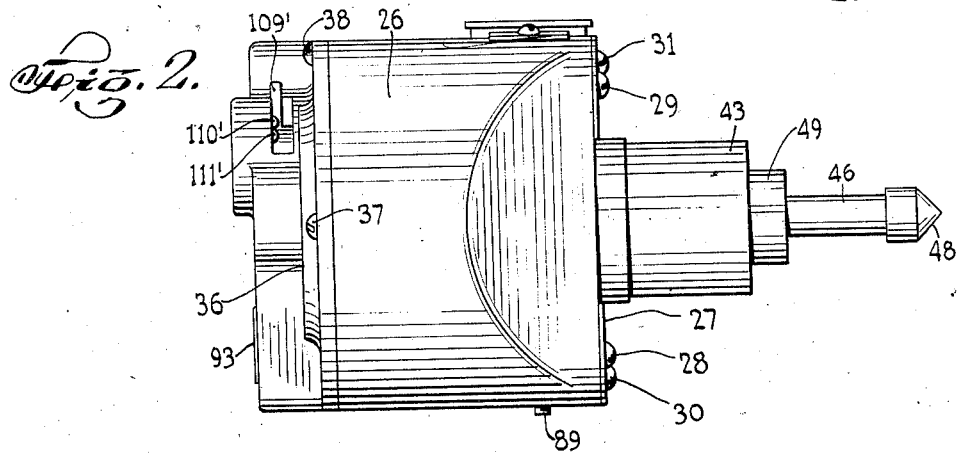
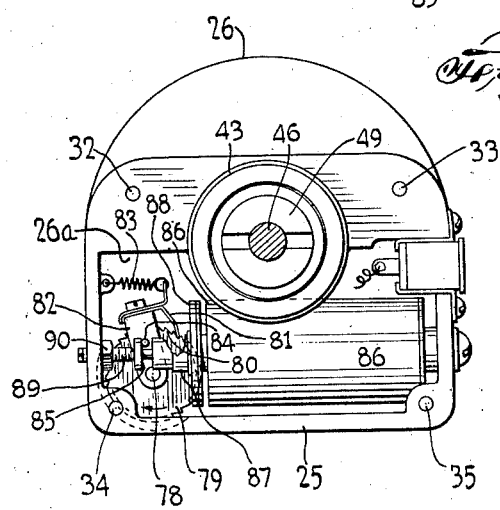
INVENTOR
Peter Davey
BY
Lyman E. Dodge
ATTORNEY Dec. 16, 1947.  P. DAVEY  2,432,730
BALANCE TESTING
Filed April 14, 1943  4 Sheets-Sheet 2
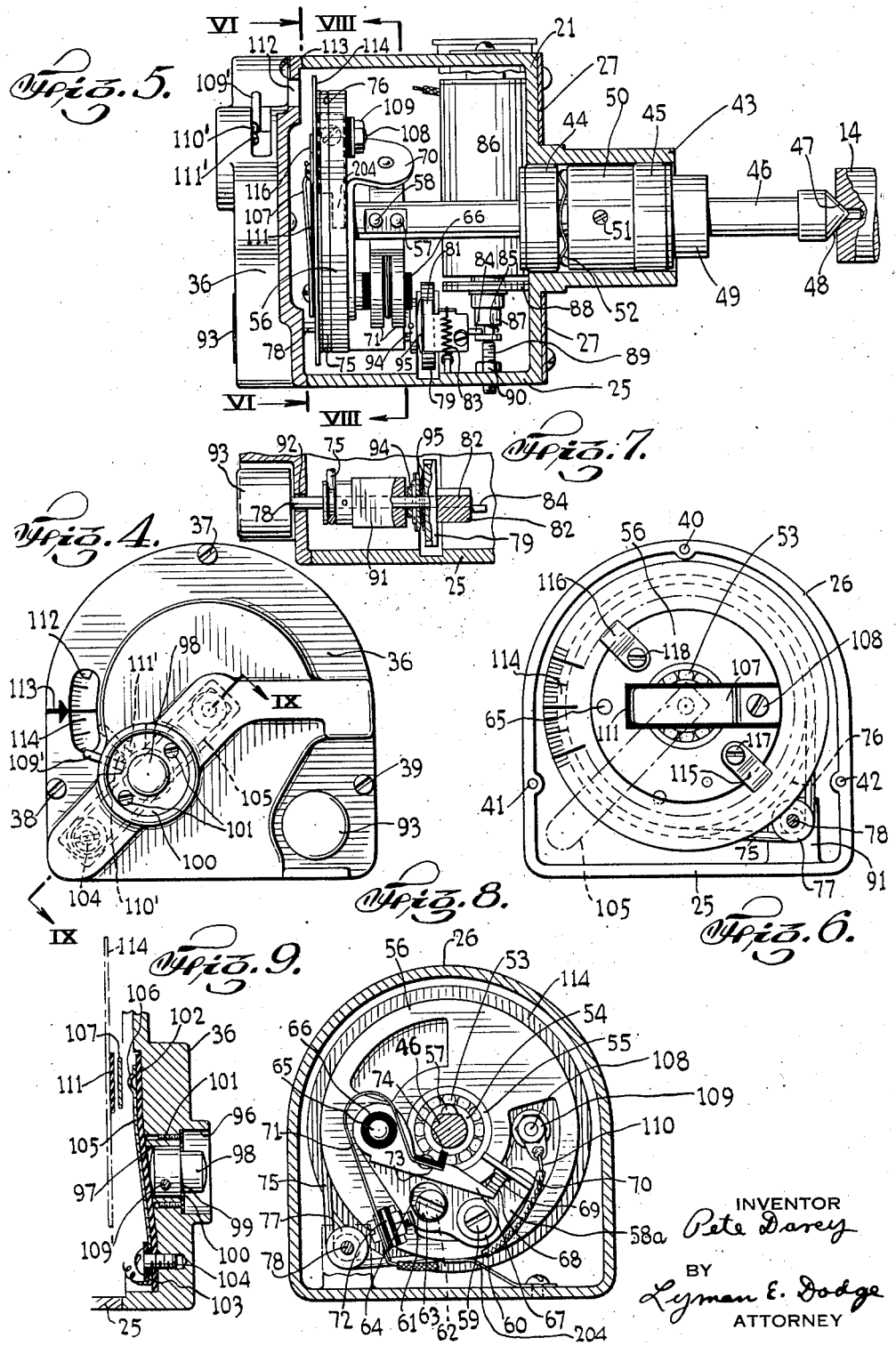
INVENTOR
Pete Davey
BY
Lyman E. Dodge
ATTORNEY Dec. 16, 1947.  P. DAVEY  2,432,730
BALANCE TESTING
Filed April 14, 1943  4 Sheets-Sheet 3
Fig. 10.
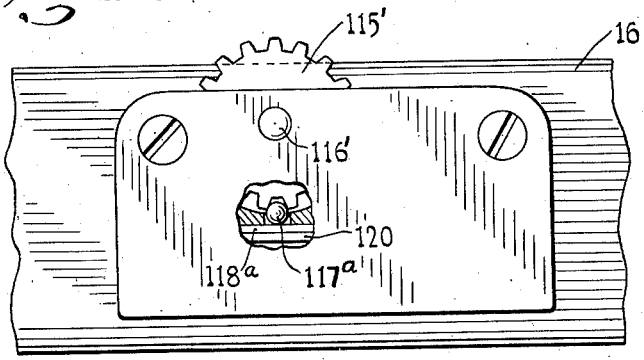
Fig. 11.
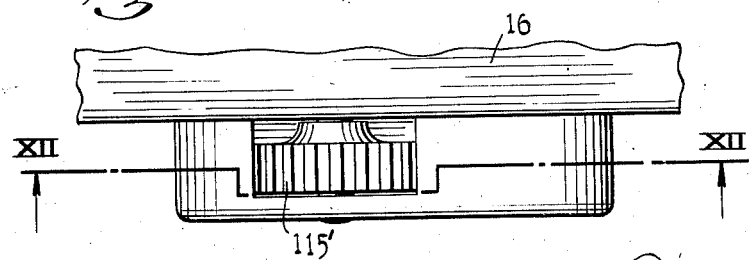
Fig. 12.
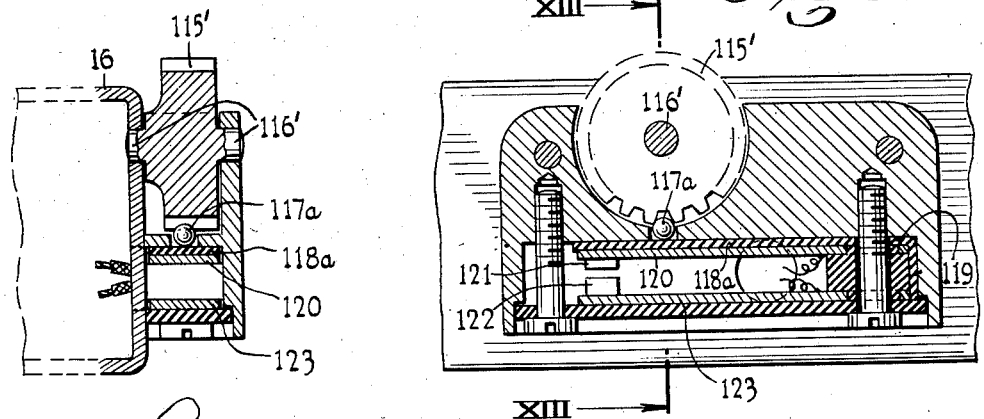
Fig. 13.
INVENTOR
Peter Davey
BY
Lyman E. Dodge
ATTORNEY

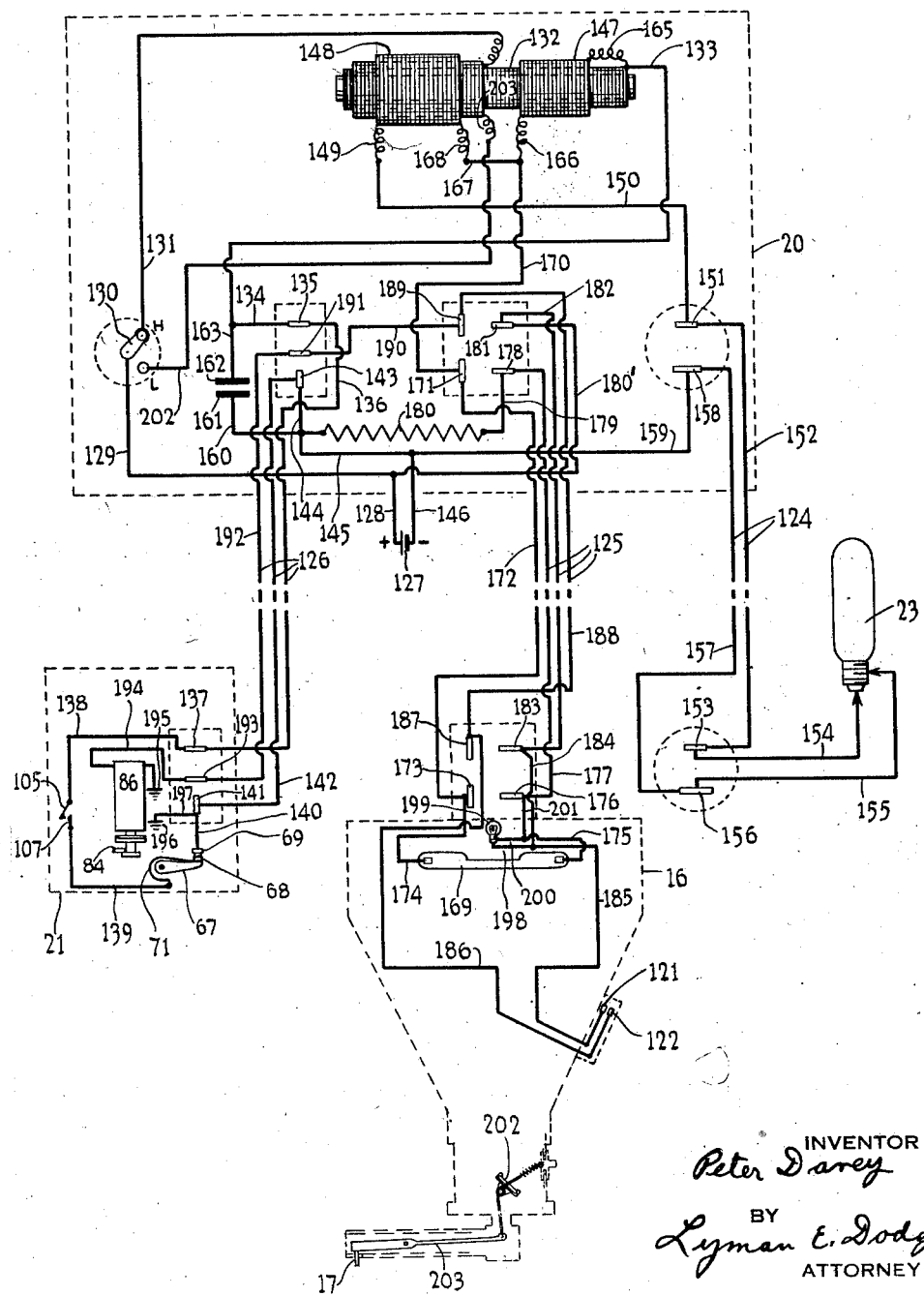

Patented Dec. 16, 1947

2,432,730

UNITED STATES PATENT OFFICE 2,432,730

BALANCE TESTING

Peter Davey, White Plains, N. Y.

Application April 14, 1943, Serial No. 483,051

2 Claims. (Cl. 315—209)

This invention relates to dynamic balancing, particularly to means for obtaining the amplitude of vibration and apparent position of the unbalancing mass in an unbalanced rotating body.

A principal object of this invention is to provide means by which a person while visually observing, as by a vibrometer, the indication of the amplitude of vibration caused by an unbalanced rotating body, and even while holding the vibrometer, may, himself, make adjustments, whereby he may be assured that the apparent position of the unbalancing mass is in the plane in which the amplitude is being measured, that is, generally stated, determine the relation of the vibrating motion produced by the unbalancing mass to the position of the unbalancing mass in the rotating body.

A further object of the invention is the provision of a circuit controller adapted to be driven by a rotating body and so constructed that it may be operated from a remote point by a simple manipulation, to produce a circuit change at any desired angular position of a rotating body with reference to a given plane through the body.

A further object of the invention is to provide means for controlling stroboscopic lamps so that they may be flashed at any desired point in the cycle of movement of a movable body and to enable variation of that point by a simple manual motion, if necessary, while actually manually holding a vibration exhibiting device in place to exhibit vibration caused by a moving body.

Other objects and advantages will appear as the description of a particular means illustrative of the invention progresses, and the novel features will be particularly pointed out in the appended claims.

In describing the invention in detail, and the particular means illustrative of the invention, reference will be had to the accompanying drawings and the several views thereon, in which, like characters of reference designate like parts throughout the several views, and in which:

Fig. 1 is a schematic view illustrating the general disposition of the various pieces of apparatus which are employed in order to obtain the amplitude of vibration caused by an unbalanced rotating body and the apparent position of the unbalance; Fig. 2 is a top plan view of a remote, manually adjustable, rotating body driven circuit controller used in connection with my invention; Fig. 3 is a view of the device, as shown by Fig. 2, as seen from the right-hand side with some parts in section and other parts removed in order to more clearly show the construction; Fig. 4 is a view of the device, as shown by Fig. 2, viewed from the left-hand side thereof; Fig. 5 is a top plan view, similar to Fig. 2, but with the upper portion of the case cut away in order to more clearly illustrate the interior construction; Fig. 6 is a cross section on the plane indicated by the line VI—VI of Fig. 5, viewed in the direction of the arrows at the ends of the line; Fig. 7 is a detail view of a clutch mechanism and its associated parts forming part of the device of Fig. 5; Fig. 8 is a cross sectional view of the device, as shown in Fig. 5, on the plane indicated by the line VIII—VIII of Fig. 5, viewed in the direction of the arrows at the ends of the line; Fig. 9 is a fragmentary detail view illustrating the construction and operation of a push-button-switch included in the device, Fig. 5; Fig. 10 is a fragmentary enlarged view showing the construction of a manually operable circuit controller associated with a vibrometer used in my invention. Fig. 11 is a fragmentary top plan view of the device as shown in Fig. 10; Fig. 12 is a cross sectional view on the plane indicated by the line XII—XII of Fig. 11, viewed in the direction of the arrows at the ends of the line. Fig. 13 is a cross sectional view on the plane indicated by the line XIII—XIII of Fig. 12 viewed in the direction of the arrows at the ends of the line; Fig. 14 is a schematic view illustrating the wiring connections for associating the various pieces of apparatus used in carrying out my invention.

The desirability and even the necessity for removing unbalance in rotating bodies is becoming recognized more and more. This is particularly true in the case of bodies rotated at relatively high speed. Rotating bodies which are in unbalance not only cause a disagreeable vibration, but also wear out more quickly and if the unbalance is one which is increasing, may suddenly destroy themselves.

Many machines have been devised for ascertaining the data necessary for balancing machines and parts of machines in the shop or at the bench. These balancing machines may be so constructed that all parts are in such positions and so supported that they may be manipulated readily by one person.

A more difficult problem arises in ascertaining the data necessary for balancing machines after they have been manufactured and installed in various situations and where it is quite impossible to use some one of the well known shop or bench balancing machines for balancing. It is in such situations, that is, balancing in the field, to which my means are particularly adapted.

The general arrangement of my means is best shown in Fig. 1. For illustration, in Fig. 1, there has been shown a rotatable body 13 mounted on a shaft 14 which is supported, at one end, in a box 15. The body 13 is assumed, when rotated, to cause a vibration, in the horizontal plane, of the box 15 due to unbalance in the body 13. In order to correct the unbalance, both its value and its position must be known.

In order to ascertain the value of unbalance, it is necessary to measure the amplitude of the vibration caused by that unbalance. I make use of a vibrometer. The preferred vibrometer 16 is of my invention, and is shown, described, and claimed, in United States Patent No. 1,949,603 granted March 6, 1934. This vibrometer is of a construction such that when a movable point 17 thereof is positioned against a box, such as 15, vibration of the box is transmitted to the point 17 and so to internal mechanism of the vibrometer and the amplitude of the vibration in fractions of an inch is indicated on the dial 18 by the movement of a line of white light, all as described in the said patent.

In order to obtain the apparent position of the unbalancing mass in the body 13, it is necessary, for simplicity in calculation, to ascertain the exact point in the periphery of the body 13, which lies in the plane in which the amplitude of vibration is being measured, which is, generally, the exact point of the body lying in a horizontal plane passing through the longitudinal axis of the rotating body, in the present case, through the longitudinal axis of the shaft 14, at the moment when that point is the high-spot, or apparent position of the unbalancing mass, or the so-called phase angle of unbalance. I provide a means for indicating when the high-spot is in the plane of the vibration being measured and also means for visually ascertaining what particular part of the rotating body is at that point.

The means used by me comprise a rotating body driven circuit controller 21, a discharge lamp, neon lamp, or stroboscopic lamp 23 and an adjustable discharge, neon, or stroboscopic lamp beam or band 19, together with the necessary electrical current supply and transformer devices. The angular position referred to any plane, say the horizontal plane through the longitudinal axis of the shaft 14, at which a circuit is changed by the rotating body driven circuit controller 21, determines the position of neon beam 19. When circuit controller 21 changes its circuit at the moment the amplitude of vibration, as indicated by the vibrometer 16, is a maximum, the neon beam 19 is at the extreme right, as shown in Fig. 1. At that moment the neon lamp 23, also being, in fact, a stroboscope, is also energized momentarily. At that time the high-spot or apparent position of the unbalancing mass is in the same horizontal plane as the longitudinal axis of the shaft 14, that is, opposite the arrow 25, the neon lamp 23 illuminating that point will enable the operator to see that the point 6 on the body 13 is the high point of the body 13.

The principles and means of the foregoing descriptions are all in the prior art and are illustrated and described in my before mentioned patent.

In accordance with prior art, the operator of the vibrometer 16 would require the assistance of another person to hold the rotary body driven circuit controller 21 against the end of shaft 14. It would be most unlikely that the circuit controller 21 would change the circuit at the proper instant so that it would be necessary to adjust the circuit controller by the person holding the circuit controller, so that the desired conditions would obtain. Directions for adjusting the circuit controller 21 would have to come from the operator of the vibrometer 16. It has been found in practice that such a method is unsatisfactory, to say the least. This arises from the fact that the conditions under which the devices are used are often and quite generally unsatisfactory, because either the holder of the circuit controller 21 is inexperienced or does not quite appreciate the directions for adjustment given to him, or the extreme noises, generally encountered, prevent the easy transmission of instructions from the holder of the vibrometer to the holder of the circuit controller 21. In fact, in many situations, the holder of the vibrometer 16 and the holder of the controller 21 are separated by a considerable distance which further adds to the difficulty of communication.

In order to remedy the difficulties of the prior means, I have provided a manually operable switch finger piece 24 on the vibrometer 16 and have so constructed the controller 21, that by means of that switch and an electrical current and electrical conductors between the switch on vibrometer 16 and the circuit controller 21, I may, even while constantly reading the amplitude of vibration, adjust the circuit controller 21 to the desired position so that the desired conditions are attained, so that the circuit controller 21 may be held in operative position by a person or by an inanimate device.

The manually adjustable, rotating body driven circuit controller 21 has an enclosing casing 25. This enclosing casing includes an enclosing partially truncated cylindrical top 26, best shown in Fig. 8. The casing, when viewed from the right-hand side as drawn in Fig. 5, is provided with an opening 26ª, as best shown in Fig. 3. This opening is closed by a suitably formed plate 27 secured in any suitable or appropriate manner as by means of screws 28, 29, 30, and 31 screw threaded into threaded cavities 32, 33, 34, and 35, respectively in the casing 25.

The left-hand side of the casing, as drawn in Fig. 5, also has an opening which is closed by a cover 36 attached in any suitable or appropriate manner, as by screws 37, 38, 39 threaded into screw cavities 40, 41, 42, respectively, of the casing 25.

The casing 25, on the right-hand side, as viewed in Fig. 5, is provided with a protuberance or bearing support 43 substantially in the form of a hollow cylinder. Within this protuberance 43 are positioned ball bearings 44 and 45. These ball bearings support the actuating shaft 46.

The actuating shaft 46 is provided with a conical end or point 48 adapted to bear in a conical depression 47 of the shaft 14 of a rotating body, and thereby be driven. The shaft 46 is provided with suitable collars as 49 and 50, to maintain it in proper position longitudinally. The collar 50 may be adjusted longitudinally of shaft 46 and held in adjusted position by means of a set screw 51. A spring washer 52 is preferably positioned between the ball bearings 44 and the collar 50, in order to exert a constant spring pressure thereagainst in order that the pressure of the conical point 48 against the shaft 14 will not result in creating undue friction. The far end of the shaft 46 is provided with a ball bearing 53, the inner race 54 of which is firmly attached to shaft 46 and the outer race 55 of which is firmly attached to an adjustable contacts carrying disc 56 made of any suitable or appropriate material. This construction, while supporting the disc 56, allows it to be rotated independently of the shaft 46. The shaft 46 also carries the cams 57 and 58.

The contact carrying disc 56 supports the cam actuated electrical circuit make and break devices. These include an oscillatable plate 58ª, the broad surface of which bears directly against the disc 56, as best shown in Fig. 8. This oscillatable plate is secured in oscillated position by a screw 59, screw threaded directly into the disc 56 with an interposed washer 60. When this screw 59 is driven home the plate 58ᵃ is held in adjusted or oscillated position. If the plate is not in the proper position, it is oscillated to the proper position by loosening the screw 59 and then rotating, as by a screw driver in slot 61, the screw 62, screw threaded into the disc 56 and bearing the cam head 63 positioned in the cam slot 64 of the oscillatable plate 58ᵃ. By means of this cam headed screw 62, proper adjustment of plate 58ᵃ may be obtained.

Plate 58ᵃ bears a stud 65 and around this stud is an insulating sleeve 66. Surrounding and supported by the insulating sleeve 66 is the movable contact arm 67, bearing at its extreme end the electrical contact 68 arranged and positioned to cooperate with the electrical contact 69 positioned on the right angle bent portion 70 of the oscillatable plate 58ᵃ. The contact arm 67 is spring pressed to cause its contact 68 to make contact with 69, by means of the somewhat U-shaped spring 71 which is supported at one end by the post 72 mounted on the disc 56. The other end 73 is attached to the movable contact arm 67, so as to cause that arm to be lifted upwardly, as viewed in Fig. 8, rotating on stud 65. The end 73 also bears the cam engaging projection 74, so that when cams 57 and 58 are rotated, they contact member 74 and separate movable contacts 68 and 69.

The separation of contacts 68 and 69 will occur at an instant in the rotation of the shaft 46, that is, at a definite angular position of that shaft with reference to a given plane depending upon the position of disc 56 rotatively about shaft 46. From the hereinbefore given description, it will be understood that it is necessary to cause the circuit change to occur at a particular angular position of the rotating body which drives shaft 46. To accomplish this, the disc 56 must be rotated to different angular positions about the shaft 46. The direct driving means for accomplishing this adjustment is the belt 75 passing around disc 56 and seated in the groove 76. The belt 75 also passes around the driving pulley 77 mounted on shaft 78.

In order to suitably rotate shaft 78, and so pulley 77, and so disc 56 to a new and desired position, applicant mounts a toothed wheel 79 on the shaft 78, best shown in Fig. 3. The teeth 80 of this wheel are engaged by a driving detent 81 mounted on an arm 82. The arm 82 is oscillatably mounted on shaft 78 and is held in one direction by the tension spring 83. The arm 82 bears an outstanding driving pin 84. This driving pin 84 lies in a groove 85 forming part of the core and armature of electro-magnet or solenoid 86. In Fig. 3, the core 87 and the armature 88 are shown in the outer or unattracted position and the limit of outward movement is controlled by the stop pin 89, passing screw threadedly through the wall of the case 25 and held in adjusted position by the lock nut 90. When the solenoid 86 is suitably energized, the armature 88 and the core 87 move to the right, as viewed in Fig. 3, carrying the groove 85 to the right, and so carrying the driving pin 84 to the right, which in turn moves arm 82 to the right and causes detent 81, engaging with a tooth, as 80, of the toothed wheel 79 to rotate that wheel in a clockwise direction, as viewed in Fig. 3. This movement causes shaft 78 to move in a clock-wise direction, as viewed in Fig. 8, and so causes the belt 75 to move the disc 56 in a clock-wise direction, so that if the shaft 46, as viewed in Fig. 8, is rotating in a counter clock-wise direction, then the breaking of the circuit by the contacts 68 and 69 will occur earlier in the rotation of the shaft 46.

In order to prevent too free movement of disc 56, a spring member 204 may have one end bearing thereagainst and the other end fastened to the casing 25.

The shaft 78, as most clearly shown in Fig. 7, is supported by a bearing 91 and extends to the left, as viewed in Fig. 7, through an orifice 92 at the end of the casing and has, on the outside of the casing, a finger piece 93 mounted thereon. By rotating this finger piece, the contacts disc 56 may be adjusted without an energization of the solenoid 86. In order to allow a clockwise or counter clock-wise rotation of shaft 78 by finger piece 93, even if the detent 81 engaging in a tooth 80 of the wheel 79 would act to prevent it, adjustment wheel 79 is rotatively mounted on shaft 78 so that drive shaft 78 may be rotated independently of wheel 79. In order to drive shaft 78 by wheel 79 a member 94 is positioned on the shaft and between 94 and the wheel 79 is a disc spring 95 furnishing sufficient friction, so that when wheel 79 is turned, the shaft 78 will turn. Shaft 78 nevertheless may be turned by hand by finger piece 93, even if moved in a direction which brings a tooth of the wheel 79 into engagement with the detent 81.

It should be noted that in describing the particular type of circuit controller used, selection has been made of a controller in which its contacts, such as 68 and 69 are normally closed. Of course, it is understood that it is not intended to exclude a construction in which these contacts can be used as normally open contacts to be closed by the contact of cam 57 with the member 74. In my preferred construction, it is best to use the normally closed type of contacts at 68 and 69. For this reason, it is best to provide a means, whereby current will not pass through these abutted contacts except when desired. For this purpose I provide a hand operated switch.

In Fig. 9 there is shown a depression 96 at the end 36 of the casing. This depression communicates with a through bore 97 in which is positioned a button 98 formed with a shoulder 99 which abuts a rim 100 attached, as by screws, as 101, to the casing. The inner end of the button 98 abuts an insulated strip 102 which is fastened at the end 103 only, in any suitable or appropriate manner, as by the screw 104. The screw 104 also holds the metallic spring electrical conducting member 105 which is provided with a hump 106. By pressing button 98, member 105 at the hump 106 contacts metallic electrical conducting spring 107 and makes contact therewith. Spring 107, as best shown in Fig. 6, is attached to disc 56 by screw 108 which passes through the disc 56 and appears, as shown in Fig. 8, bearing the nut 109 and holding the end of conductor 110. In order to suitably insulate the electrical circuits, an insulation strip 111 is positioned between spring 107 and the ball bearing 53 at the end of shaft 46. The spring 105, shown in Fig. 9, is also shown in Fig. 6, but it is shown in dash lines as it is in front of the plane of section upon which Fig. 6 is taken.

The spring 105 may be contacted by 107 by pressure on 98 but it may also be moved permanently into contact with contact strip 107 by manipulating pin 109'. This pin 109' when moved from the full line position to the dotted line position, as shown in Fig. 4, moves the button 98 inwardly, or to the left, as shown in Fig. 9, because the pin 109' is cammed to move button 98 by a projection 110'. When pin 109' rests between 110' and 111', and partly on each, it holds spring 105 constantly in contact with 107.

The object of the circuit closing arrangement including the spring 105 is to be able to have the circuit through contacts 68 and 69 usually open but sometimes it is desired to have those contacts in a closed circuit. This may be done momentarily or for a very short time by pressure upon button 98. If it is desired to have the circuit completed for some considerable time or continuously, this may be done by moving pin 109' to a position between projections 110' and 111' and bearing on each.

The end 36 of the casing 25 is provided with a sight opening 112 and a zero mark 113. Within the casing there is attached to the contacts carrying disc 56 a graduated scale 114, attached to the disc 56 in any suitable or appropriate manner, as by means of tabs 115 and 116 and screws 117 and 118. This graduated scale may be used in various ways to obtain various sorts of information all depending upon the fact that the scale rotates in unison with disc 56, and the fact that cam 57 causes a separation of contacts 68 and 69 at a particular reading of the scale referred to line 113, as zero. If disc 56 is adjusted so that cam 57 breaks contacts 68 and 69 at different angular positions the difference in angular degrees between the first position of breaking and the second position may be indicated by the difference in reading on the scale 114 with reference to the zero line 113. In short, applicant provides a means by which the circuit change may take place at different angular positions in reference to a given plane through the axis of a rotating body and he provides means, whereby a variation of the position in which the circuit changes may be determined in angular degrees.

In Fig. 10, the side of vibrometer 16 is shown in elevation. A toothed finger wheel 115' is shown rotatable upon stub shafts as 116'. The teeth, as best shown in Fig. 12, engage a ball 117a, it being understood that a cylinder would be equally appropriate, bearing against insulating leaf 118a secured at one end, that is, end 119. When the finger wheel 115' is moved to depress ball 117a successively by the teeth thereon, the insulation 118a is depressed and along with it the metallic spring 120 to cause its point 121 to touch metallic point 122 positioned on metallic spring 123. Springs 120 and 123 may be included in any desired circuit. In the particular case considered, they are included in the circuit which includes the solenoid 86 and this circuit, as will be hereinafter more fully described, when completed, by means of finger wheel 115', one tooth at a time, completes a circuit for solenoid 86 so it is energized momentarily and deenergized, so that a step by step movement of wheel 79 is caused.

The manner in which the various devices shown in Fig. 1 are interconnected electrically is shown by the wiring diagram, Fig. 14. In this diagram, 16 indicates the vibrometer. 23 indicates the hand neon lamp. 21 indicates the rotary body driven circuit controller. 20 designates the junction box.

In the diagram, Fig. 14, the several pieces of apparatus are shown electrically connected by cables. These cables consist of two or more wires and all of them together constitute the cables of which one is designated 124, another 125, and another 126.

With all parts in position, as shown in Fig. 1, the circuits will be as shown in Fig. 14. Under such conditions, the first action is to close the circuit between 105 and 107. This causes a flow of current from the battery 127 in a circuit, as follows: positive terminal of the battery 127, wires 128 and 129, switch arm 130, wire 131, primary 132 of the transformer, other terminal of the primary to wire 133, wire 134, connecting receptacle 135, wire 136, connecting receptacle 137, wire 138, switch arm 105, contact strip 107, wire 139, spring 71, contact arm 67, contact point 68, contact point 69, wire 140, connecting receptacle 141, wire 142, connecting receptacle 143, and wires 144, 145, and 146 to the negative terminal of the battery 127. Current flowing in the above traced path causes an energization of the primary 132 of the transformer and so causes an induced current in the secondaries 147 and 148, upon a make or break of the primary circuit.

It will be noticed that a condenser 162, as is usual, is connected across the receptacles 143 and 135, which is in effect across the contacts 68 and 69.

With secondaries 147 and 148 energized, a current then flows, as follows: one terminal 149 of the secondary 148, wire 150, connecting receptacle 151, wire 152, connecting receptacle 153, wire 154, hand neon lamp 23, wire 155, connecting receptacle 156, wire 157, connecting receptacle 158, wires 159 and 146, battery 127, wires 128 and 129, switch arm 130, wire 131, primary 132, wire 165, secondary 147, and wires 166, 167, and 168 to the other terminal of secondary 148. Current will flow in secondaries 147 and 148 only at the moment that contacts 68 and 69 separate, but when it does flow, it energizes lamp 23 so that the particular numeral on the end of rotating body 13 in the horizontal plane, that is, at arrow 25 may be ascertained.

At the same time that the neon lamp 23 is energized, the neon lamp 169 in the vibrometer 16 is energized by a circuit in which current flows, as follows: terminal 166 of secondary 147, wire 170, connecting receptacle 171, wire 172, connecting receptacle 173, wire 174, neon lamp 169, other terminal of neon lamp 169 wires 175, and 201 connecting receptacle 176, wire 177, connecing receptacle 178, wire 179, resistance 180, wires 145 and 146, battery 127, wires 128 and 129, switch arm 130, wire 131, primary 132, wire 165, and secondary 147. Due to the current flow in the above traced circuit, the neon lamp 169 is energized and creates a band, 19, on the vibrometer 16. This band may not be in the extreme right-hand position, as shown in Fig. 1, and, consequently, it is necessary to bring it to the extreme right-hand position. This is done by energizing solenoid 86. The means for energizing solenoid 86 includes the hand operated switch 24, as shown in Fig. 1, on vibrometer 16. When the toothed wheel 115', of Figs. 10 to 13 inclusive, is rotated tooth by tooth contacts 121 and 122 are brought together upon the passage of a tooth by ball 117a, as shown in Fig. 12, and then are separated when the ball 117a engages between two teeth. In Fig. 14, when the contacts 121 and 122 are brought together, as by movement of toothed wheel 115', a circuit is formed, as follows: positive terminal of battery 127, wires 128 and 180', connecting receptacle 181, wire 182, connecting receptacle 183, wires 184 and 185, contact point 121, contact point 122, wire 186, connecting receptacle 187, wire 188, connecting receptacle 189, wire 190, connecting receptacle 191, wire 192, connecting receptacle 193, wire 194, solenoid 86, the other side of solenoid 86 to ground 195, ground 196, wire 197, connecting receptacle 141, wire 142, connecting receptacle 143, wires 144, 145, and 146 to the other side of the battery 127. Current flowing in the above traced path energizes solenoid 86 and causes the toothed wheel 79 to be moved in a clock-wise direction, as viewed in Fig. 3. As the finger wheel 115' is moved tooth by tooth, the toothed wheel 79 is actuated and the angular position, with reference to a given plane through the longitudinal axis of the rotating body, at which the contacts 68 and 69 separate, is changed. In the instant case, the adjustment will continue until the neon band reaches the extreme right-hand position, as shown in Fig. 1. Under such conditions the contacts will separate at the very instant when the high-spot of the rotating body 13 is in the horizontal plane passing through the longitudinal axis of the shaft 14, at which time, the amplitude of vibration operating on point 17 would be a maximum and at the same time the neon lamp 23 will indicate the numeral at the end of the rotating body 13, which is seen at that time to be numeral 6.

At the same time that the neon lamps are being energized, the lamp for giving a white line, to indicate amplitude of vibration on scale 18, would also be energized by a circuit, as follows: positive terminal of battery 127, wires 128 and 180', connecting receptacle 181, wire 182, connecting receptacle 183, wires 184 and 198, filament lamp 199, wires 200 and 201, connecting receptacle 176, wire 177, connecting receptacle 178, wire 179, resistance 180, and wires 145 and 146 to the other terminal of the battery 127.

In some cases it is desirable and even necessary to use a primary on the transformer having more turns therein. In such cases, the switch 130 instead of connecting wire 131, would be moved to connect with wire 202 and so to the terminal 203 of the primary 132, so that then the primary circuit would include a larger number of layers than the primary connected into the circuit including wire 131. This is exceptionally useful in connection with relatively low speed rotary bodies.

In Fig. 14, the pivoted mirror 202 operated by lever 203 from point 17 throws the light of the lamps 169 and 199 on any suitable receiving surface as fully pointed out in the patent hereinbefore referred to.

Although the rotary body circuit controller has been described as particularly useful in connection with a vibrometer, it is to be understood that it is of general application and for a stroboscopic view solely of the rotary body, for instance, the vibrometer may be omitted. The switching means shown herein attached to the vibrometer, has been attached thereto for greater convenience in use. The vibrometer supporting the switching means for stepping the disc 56 about may, when the apparatus is used merely as a stroboscopic device, be considered merely a convenient support for the switching device, but not the only possible support.

Although I have particularly described my invention and a particular physical embodiment of apparatus, nevertheless, I desire to have it understood, that the form selected is merely illustrative and does not exhaust the possible physical embodiments of the idea of means underlying my invention.

What I claim as new and desire to secure by Letters Patent of the United States, is:

1. In a stroboscopic circuit controller, in combination: a shaft; means for rotating the shaft; a cam on the shaft; a pair of abuttable contacts; a disc mounted concentrically with the shaft; an oscillatable member mounted on the disc, said oscillatable member supporting the said contacts; means for fastening the oscillatable member in an oscillated position; means pivoting one of the contacts so that it may be moved relatively to the other contact and including a part adapted to cooperate with said cam; an electro-magnet including an armature; a rotatable toothed wheel; means associated with the armature whereby the toothed wheel is rotated by successive energizations of the electro-magnet; means for causing successive energizations of electromagnet; means including a friction clutch, connecting the toothed wheel and the disc whereby the disc is rotated about the shaft and whereby the angular position about the shaft of the cooperation of the cam and one of the contacts is progressively varied; and a discharge lamp controlled by the said contacts.

2. In a stroboscopic circuit controller, in combination: a shaft; means for rotating the shaft; a cam on the shaft; a pair of abuttable contacts, a disc mounted concentrically with the shaft; an oscillatable member mounted on the disc, said oscillatable member supporting the said contacts; means for fastening the oscillatable member in an oscillated position; means pivoting one of the contacts so that it may be moved relatively to the other contact and including a part adapted to cooperate with said cam; an electro-magnet including an armature; a rotatable toothed wheel; means associated with the armature whereby the toothed wheel is rotated by successive energizations of the electro-magnet; means for causing successive energizations of electromagnet; means, including a friction clutch connecting the toothed wheel and the disc whereby the disc is rotated about the shaft and whereby the angular position about the shaft of the cooperation of the cam and one of the contacts is progressively varied; a discharge lamp controlled by the said contacts: a graduated member attached to the said disc and a zero mark to indicate the angular displacement of the disc from a known position.

PETER DAVEY.

REFERENCES CITED

The following references are of record in the file of this patent:

UNITED STATES PATENTS

| Number | Name | Date |
| --- | --- | --- |
| 1,087,454 | McMurtry | Feb. 17, 1914 |
| 1,882,720 | Arthur | Oct. 18, 1932 |
| 1,216,745 | Starker | Feb. 20, 1917 |
| 1,949,603 | Davey | Mar. 6, 1934 |
| 1,392,028 | Torbet | Sept. 27, 1921 |
| 1,639,444 | Terry | Aug. 16, 1927 |
| 2,050,073 | Thearle | Aug. 4, 1936 |
| 2,314,287 | Pope | Mar. 16, 1943 |
| 2,127,605 | Kucher | Aug. 23, 1938 |
| 2,000,153 | Watson | May 7, 1935 |
| 1,271,748 | Nelson | July 9, 1918 |
| 1,858,985 | Davey | May 17, 1932 |
| 2,004,270 | Davey | June 11, 1935 |
| 2,191,087 | Spengler | Feb. 20, 1940 |
| 2,043,845 | Thearle | June 9, 1936 |